United States Patent
Honda et al.

(10) Patent No.: US 9,598,074 B2
(45) Date of Patent: Mar. 21, 2017

(54) VEHICLE STABILIZATION DEVICE

(71) Applicant: HONDA MOTOR CO., LTD., Minato-Ku, Tokyo (JP)

(72) Inventors: Shigehiro Honda, Wako (JP); Susumu Takahashi, Wako (JP); Hiroaki Sasaki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/874,684

(22) Filed: Oct. 5, 2015

(65) Prior Publication Data
US 2016/0096524 A1    Apr. 7, 2016

(30) Foreign Application Priority Data

Oct. 6, 2014 (JP) ................................ 2014-205756
Jul. 31, 2015 (JP) ................................ 2015-151603

(51) Int. Cl.
*B60W 30/02*    (2012.01)
*B60W 10/184*   (2012.01)
(Continued)

(52) U.S. Cl.
CPC ............. *B60W 30/02* (2013.01); *B60T 8/176* (2013.01); *B60T 8/1755* (2013.01);
(Continued)

(58) Field of Classification Search
CPC ........ B60W 30/02; B60W 40/12; G06F 19/00
See application file for complete search history.

(56) References Cited

U.S. PATENT DOCUMENTS

| | | | |
|---|---|---|---|
| 7,099,795 B1 * | 8/2006 | Gerstenmeier | B60T 8/171 702/148 |
| 7,239,949 B2 * | 7/2007 | Lu | B60G 17/018 280/5.502 |

(Continued)

FOREIGN PATENT DOCUMENTS

| | | | |
|---|---|---|---|
| JP | 2003-291838 A | 10/2003 | |
| JP | 2004-210054 A | 7/2004 | |

(Continued)

OTHER PUBLICATIONS

Office Action (Notice of Reasons for Rejection) issued in corresponding Japanese Patent Application 2015-151603, dated Dec. 27, 2016.

*Primary Examiner* — Thomas Tarcza
*Assistant Examiner* — Alex C Dunn
(74) *Attorney, Agent, or Firm* — Carrier Blackman & Associates, P.C.; Joseph P. Carrier; Jeffrey T. Gedeon

(57) ABSTRACT

A vehicle stabilization system 1 comprises a VSA device to have a braking device generate a braking force to reduce rotation of wheels and perform an anti-lock braking control when a vehicle is braked and an AS device to cancel a yawing moment applied to the vehicle. A vehicle control device estimates a friction coefficient (pad μ value of the brake pad) of a friction material for braking the wheels, calculates braking forces for the left and right wheels using the estimated friction coefficient, calculates a yawing moment applied to the vehicle based on a braking force difference between a left wheel braking force to reduce rotation of the left wheels and a right wheel braking force to reduce rotation of the right wheels and determines an operation amount on the AS device.

2 Claims, 6 Drawing Sheets

(51) Int. Cl.
  *B60W 10/22* (2006.01)
  *B60T 8/176* (2006.01)
  *B60T 8/1764* (2006.01)
  *B60T 8/1755* (2006.01)

(52) U.S. Cl.
  CPC ......... *B60T 8/1764* (2013.01); *B60W 10/184*
  (2013.01); *B60W 10/22* (2013.01)

(56) References Cited

U.S. PATENT DOCUMENTS

| | | | | |
|---|---|---|---|---|
| 7,489,995 B2* | 2/2009 | Yasui | ............ | B60T 8/172 |
| | | | | 701/36 |
| 7,650,215 B2* | 1/2010 | Lu | ............ | B60G 17/018 |
| | | | | 280/5.502 |
| 7,699,137 B2 | 4/2010 | Yasui et al. | | |
| 8,565,993 B2* | 10/2013 | Lu | ............ | B60T 8/1755 |
| | | | | 701/29.2 |
| 8,977,430 B2* | 3/2015 | Mineo | ............ | B60W 50/14 |
| | | | | 340/436 |
| 9,050,906 B2* | 6/2015 | Ito | ............ | B60L 3/00 |
| 9,139,062 B2* | 9/2015 | Ogino | ............ | B60G 17/0164 |
| 9,296,373 B2* | 3/2016 | Futamura | ............ | B60T 7/12 |
| 2003/0105574 A1* | 6/2003 | Ino | ............ | B60K 31/0008 |
| | | | | 701/93 |
| 2008/0183353 A1* | 7/2008 | Post | ............ | B60G 17/0165 |
| | | | | 701/42 |
| 2008/0255744 A1* | 10/2008 | Yasui | ............ | B60T 8/1755 |
| | | | | 701/70 |
| 2012/0209489 A1* | 8/2012 | Saito | ............ | B60T 7/042 |
| | | | | 701/70 |
| 2013/0226410 A1* | 8/2013 | Narita | ............ | B60T 8/1764 |
| | | | | 701/41 |
| 2015/0274159 A1* | 10/2015 | Lu | ............ | B60T 8/171 |
| | | | | 701/82 |

FOREIGN PATENT DOCUMENTS

| | | |
|---|---|---|
| JP | 2008-222139 A | 9/2008 |
| JP | 2009-023376 A | 2/2009 |

* cited by examiner

Large Pad μ Value

Pad μ Value = Reference Value

Small Pad μ Value

VEHICLE STABILIZATION DEVICE

CROSS REFERENCE TO RELATED APPLICATIONS

This application claims the foreign priority benefit under 35 U.S.C. §119 of Japanese patent applications of No. 2014-205756 filed on Oct. 6, 2014 and No. 2015-151603 filed on Jul. 31, 2015, the disclosures of which are incorporated herein by reference.

FIELD OF THE INVENTION

The present invention relates to a vehicle stabilization system to ensure that driving stability of a vehicle running is kept.

DESCRIPTION OF THE RELATED ART

JP2008-222139A discloses a yawing moment control system comprising a braking force distribution device that is capable of distributing a braking force to the right wheels and the left wheels and ensuring driving stability of a vehicle by controlling a yawing moment applied to the vehicle based on a braking force difference between the right wheels and the left wheels.

For example, when braking operation is being performed on a vehicle running on a split μ road on which the road surface resistance is different between right wheels and left wheels of the vehicle, the braking force distribution device as described in JP2008-222139A applies a relatively small braking force to wheels on wheels on a lower μ side while a relatively large braking force is being applied to the other wheels on a higher μ side. As a result, there is a braking force difference created between the right wheels and the left wheels of the vehicle equipped with the braking force distribution device as described in JP2008-222139A.

The braking force being applied to a wheel of a vehicle when braking operation is performed is detected usually by measuring (or calculating and estimating) a brake fluid pressure generated in a brake mechanism. In addition, there is a correlation of the braking force applied to the wheel of the vehicle with a friction coefficient (pad μ value) of a friction material for braking such as a brake pad, in general. Accordingly, as the pad μ value of the brake pad of a wheel changes due to, for example, corrosion resulting from water absorption or aged deterioration resulting from wear, the braking force applied to the wheel changes as well.

In short, if the friction coefficient of the friction material for braking of the wheel changes, a measured value for the braking force applied to the wheel becomes different from an ordinary value. In other words, the measured value for the braking force applied to the wheel is influenced by the change in the friction coefficient of the friction material for braking, which results in the difference in the braking force between the right wheels and the left wheels being influenced by the change in the friction coefficient.

Therefore, there is a risk for the yawing moment control system as described in JP2008-222139A that calculation and estimation of the yawing moment of a vehicle becomes so inaccurate that it is difficult to keep driving stability of a vehicle.

SUMMARY OF THE INVENTION

It is an objective of the present invention to provide a vehicle stabilization system to be capable of keeping driving stability of a vehicle running, if the friction coefficient of the friction material for braking changes.

To achieve this objective above mentioned, a first invention is a vehicle stabilization system comprising a vehicle driving stability control device for having a braking device generate a braking force to reduce rotation of wheels and performing an anti-lock braking control when a vehicle is braked and a yawing moment cancelling device for cancelling a yawing moment applied to the vehicle. This vehicle driving stability control device is configured to estimate a friction coefficient of a friction material for braking the wheels, calculate braking forces for the left and right wheels using the estimated friction coefficient, calculate a yawing moment applied to the vehicle based on a braking force difference between a left wheel braking force to reduce rotation of the left wheels and a right wheel braking force to reduce rotation of the right wheels and determine an operation amount on the yawing moment cancelling device.

According to the first invention, the friction coefficient of the friction material for braking wheels is estimated and braking forces for the left and right wheels are calculated by using the estimated friction coefficient. Then, a yawing moment on the vehicle is calculated based on a difference between the left wheel braking force that is calculated and the right wheel braking wheel that is calculated and an operation amount on a yawing moment cancelling device is determined based on the calculated yawing moment. In this control, if the friction coefficient of the friction material for braking changes, the yawing moment cancelling device is controlled in such a appropriate way that the operation amount on the yawing moment cancelling device is adjusted in response to this change in the coefficient of the friction material for braking.

Therefore, if the friction coefficient of the friction material for braking changes, the vehicle is controlled in such a way that the yawing moment is cancelled appropriately and driving stability of the vehicle is ensured according to the first invention.

A second invention is the vehicle stabilization system in which the vehicle driving stability control device determines that a driving road of the vehicle is a split μ road and has the yawing moment cancelling device operate by the determined operation amount, if the braking force difference is larger than a predetermined threshold value.

According to the second invention, the braking forces on the left and right wheels and the braking force difference between them are calculated making use of the estimated value for the friction coefficient (Pad μ Value of Brake Pad) of the friction material, and if the calculated braking force difference is larger than a predetermined value, he vehicle driving stability control device determines that a driving road of the vehicle is a split μ road.

Since the determination is made based on the braking force difference that is obtained taking into account the estimated value for the friction coefficient of the friction material for braking according to the second invention, it is possible to determine more accurately if the driving road of the vehicle is a split μ road in addition to the effect of the first invention.

A third invention is the vehicle stabilization system in which the vehicle driving stability control device estimates the friction coefficient of the friction material for braking the wheels based on a brake fluid pressure supplied to the braking device and a front-rear direction acceleration of the vehicle.

According to the third invention, since the vehicle driving stability control device estimates the friction coefficient of the friction material for braking the wheels based on a brake fluid pressure supplied to the braking device and a front-rear direction acceleration of the vehicle, the friction coefficient of the friction material for braking the wheels is easily estimated without any sensor to measure the friction coefficient.

A fourth invention is the vehicle stabilization system in which the yawing moment cancelling device is a steering device configured to be capable of automatically turning steered wheels of the vehicle.

According to the fourth invention, the vehicle stabilization system is provided further with the steering device that is capable of automatically turning steered wheel irrespective of driver's intention.

As mentioned above, the present invention enables ensuring driving stability of the vehicle if the friction coefficient of the friction material for braking changes.

BRIEF DESCRIPTION OF THE DRAWINGS

FIG. 4A shows the brake fluid pressure with the pad μ value being larger than a reference value. FIG. 4B shows the brake fluid pressure with the pad μ value being equal to the reference value. FIG. 4C shows the brake fluid pressure with the pad μ value being smaller than the reference value.

DETAILED DESCRIPTION OF THE INVENTION

Hereinafter, embodiments of the present invention are explained in detail with reference to appropriate figures that are attached.

Figure 1:
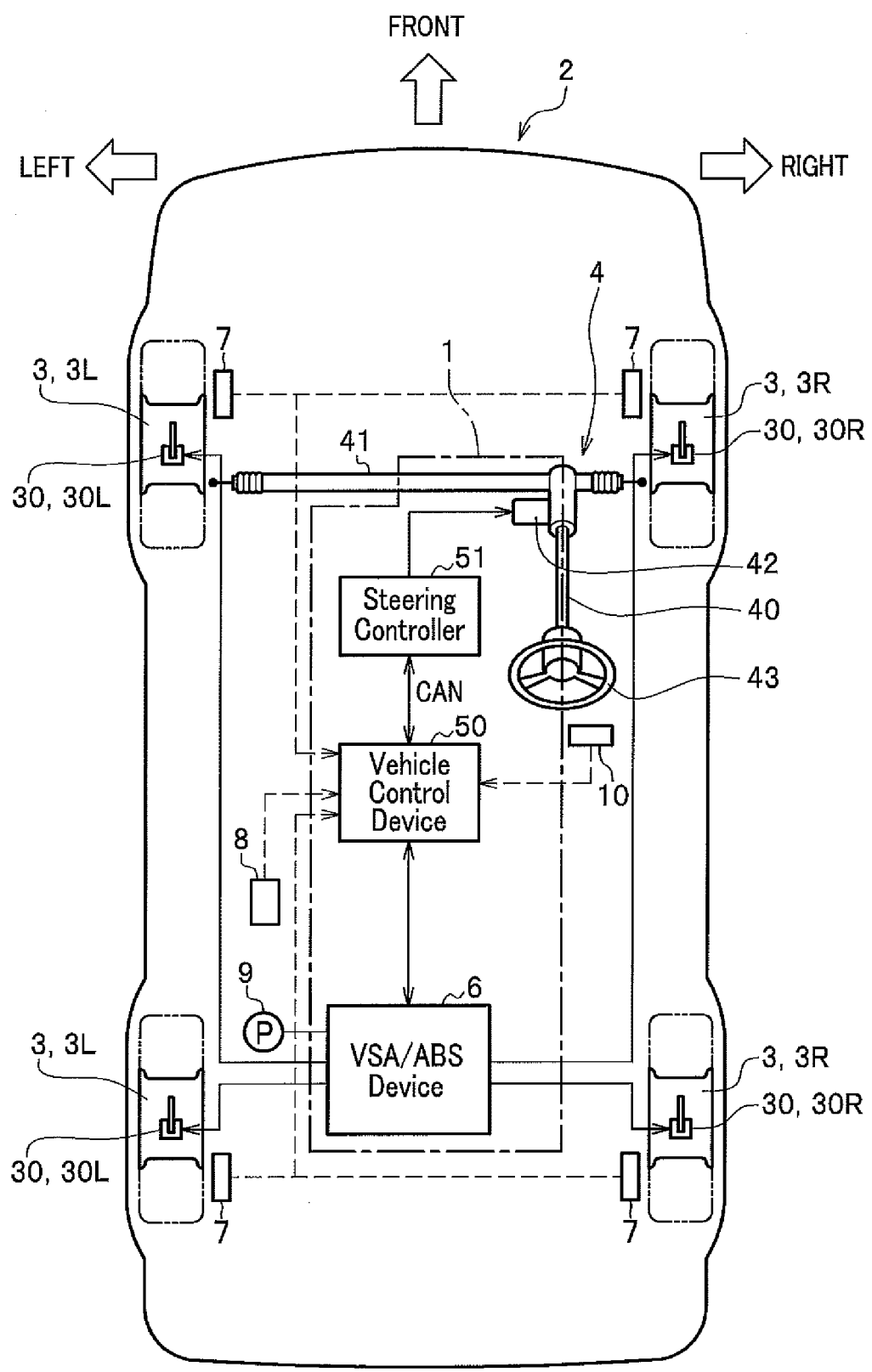
FIG. 1 is a figure showing a vehicle equipped with a vehicle stabilization system.

FIG. 1 is a figure showing a vehicle equipped with a vehicle stabilization system.

As shown in FIG. 1, a vehicle stabilization system 1 according to an embodiment of the present invention is installed in a vehicle 2 and has a function to keep driving stability of the vehicle 2. The vehicle stabilization system 1 of the embodiment comprises an active steering device (AS device) 4, a VSA device 6, an active steering motor (AS motor) 42, a vehicle control device 50 and a steering controller 51. The VSA device 6, the vehicle control device 50 and the steering controller 51 constitute a "vehicle driving stabilization device" included in the present embodiment.

The vehicle 2 is a four wheel vehicle having four wheels 3, of which two front wheels are steered wheels. There is a braking device 30 such as a disk brake mechanism installed to each of the wheels 3.

The braking device 30 is not limited to the disk brake mechanism and may be a drum brake mechanism. The vehicle 2 may have four wheels 3 all of which are steered wheels.

As shown in FIG. 1, the vehicle 2 of the present embodiment has a left side (LEFT) and a right side (RIGHT) which correspond respectively to a left side and right side of a person facing the front (FRONT) of the vehicle 2.

Hereinafter, an attached character "L" indicates the left side and an attached character "R" indicates the right side, when it is necessary to indicate the sides in this way. For example, the wheels on the left side of the vehicle 2 are referred to as "3L" while the wheels on the right side of the vehicle 2 are referred to as "3R".

As explained, the vehicle 2 is equipped with the AS device 4. The AS motor 42 is installed in the AS device 4 and is configured to be driven by an amount that is in accordance with an operation amount by which a driver steers the steering wheel 43. Alternatively, the steered wheels can be turned without the steering wheel being operated by the driver. The AS motor 42 is controlled by the steering controller 51. The AS motor 42 can be controlled by the steering controller 51 based on a method that has been publicly well known.

The AS device 4 may be a device having, what is called, a steer-by-wire function, with which a rack axis 41 is operated independently from a steering shaft 40 and displaced by operation of the AS motor 42 that is driven by the amount in accordance with the operation amount by which the steering wheel 43 is operated.

A braking device 30 is driven by the brake fluid pressure generated by braking control by the VSA device 6. When a brake pedal that is not shown is pushed down, the VSA device 6 sets ABS (Anti-Lock Brake System) in operation if it is necessary to do so, for example, if any of the wheels 3 is locked or possibly locked. The VSA device 6 regulates the brake fluid pressure to be supplied to the braking device 30 to set ABS in operation. The braking device 30 generates a braking force that is commensurate with the brake fluid pressure that is supplied based on braking control by the VSA device 6.

The VSA device 6 is capable of controlling the braking force to be applied to each of the four wheels 3 independently from the others and controlling the braking device 30 to reduce an over steer state and an under steer state.

Hereinafter, a braking force to reduce rotation of the left side wheels 3L is referred to as a left wheel braking force and a braking force to reduce rotation of the right wheels 3R is referred to as a right wheel braking force.

The vehicle 2 is equipped with the vehicle control device 50. The vehicle control device 50 comprises CPU (Central Processing Unit), ROM (Read Only Memory), RAM (Random Access memory) and a circuit connected with these components.

The vehicle control device 50 is connected with the steering controller 51 and the VSA device 6 through communication lines and is able to mutually communicate with these devices. The communication lines to connect between the vehicle control device 50, the steering controller 51 and the VSA device 6 may be, for example, CAN (Controller Area Network), but are not limited to these lines.

In addition, the vehicle 2 comprises wheel speed sensors 7, an acceleration sensor 8, a fluid pressure sensor 9 and a steering angle sensor 10.

The wheel speed sensor 7 is configured to detect a rotation speed of each of the wheels 3 (wheel speed). The wheel speed sensors 7 output wheel speed signals for the detected wheel speeds to the vehicle control device 50. The vehicle control device 50 calculates a vehicle speed of the vehicle 2 (vehicle body speed) from the wheel speed signals input to the vehicle control device 50.

The acceleration sensor 8 is configured to detect an acceleration in the front-rear direction of the vehicle 2 (front-rear direction acceleration). The acceleration sensor 8 outputs an acceleration signal for the front-rear direction acceleration to the vehicle control device 50. The vehicle control device 50 receives the acceleration signal and calculates the front-rear direction acceleration from the acceleration signal.

The fluid pressure sensor 9 is configured to detect the brake fluid pressure supplied to the braking device 30. The VSA device 6 calculates the brake fluid pressure to be supplied to the braking device 30 based on the detected brake fluid pressure and the control status of the VSA device 6. The calculated brake fluid pressure to be supplied is input to the vehicle control device 50.

Alternatively the VSA device 6 may inform the vehicle control device 50 of the brake fluid pressures to be supplied to the left wheel braking device 30L and the right wheel braking device 30R through the communication line (CAN). In this case, the vehicle control device 50 is able to obtain the brake fluid pressure to be supplied from the VSA device 6 to the braking device 30 (the left wheel braking device 30L and the right wheel braking device 30R).

The steering angle sensor 10 is configured to detect an amount (steering angle) by which the steering wheel 43 is turned and output a steering angle signal for the detected the steering angle to the vehicle control device 50. Alternatively, the steering angle sensor 10 may detect a steering angle of the wheels 3 that are configured to be steered and output a steering angle signal for the detected steering angle to the vehicle control device 50.

The VSA device 6 is configured to perform such control operation as to keep driving stability of the vehicle 2 by adjusting the brake fluid pressure to be supplied to each of the wheels 3, when a driver pushes down a brake pedal (not shown) while the vehicle 2 is running on the split μ road.

Figure 2:
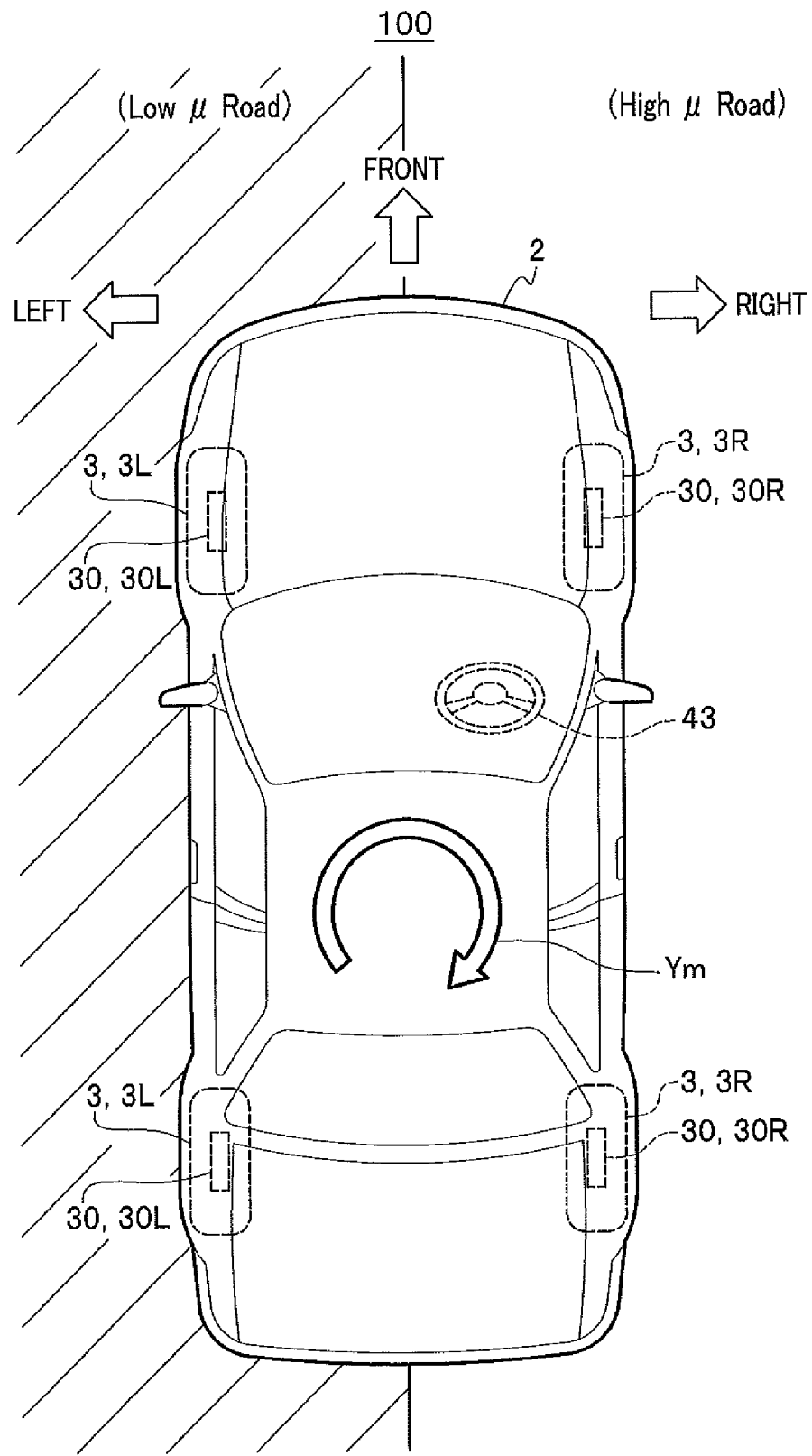
FIG. 2 shows a vehicle running on a split μ road.
Figure 3A:
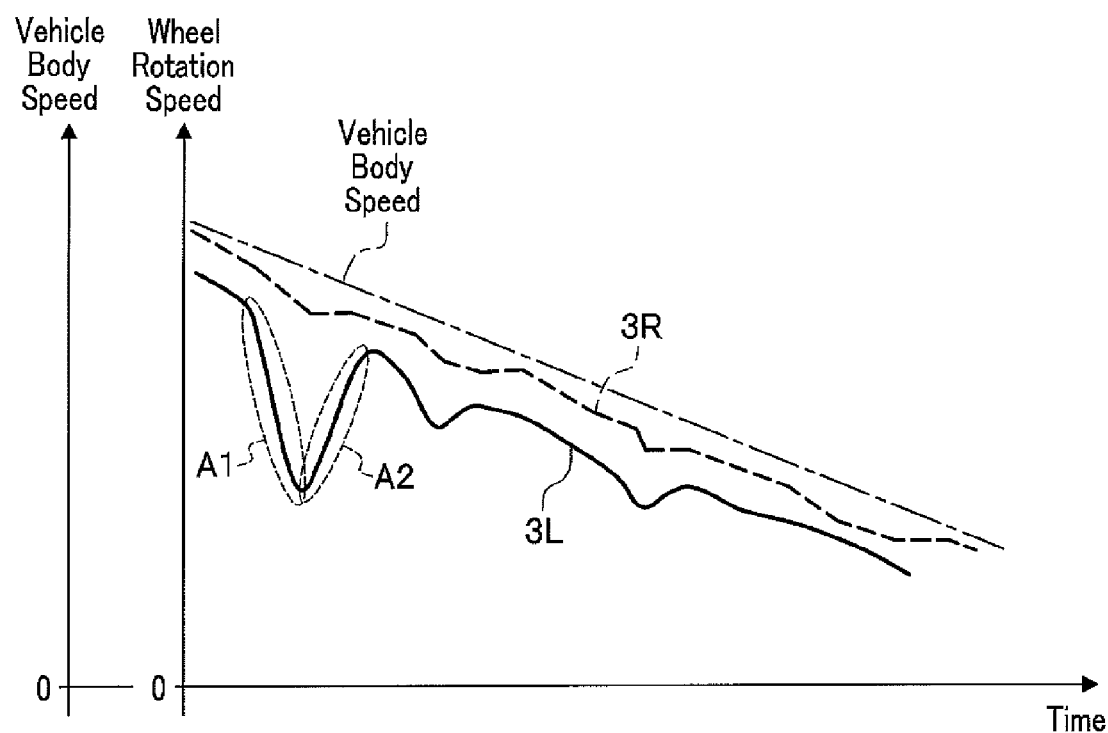
FIG. 3A is a graph illustrating a vehicle body speed and wheel speeds of a vehicle running on the split μ road.
Figure 3B:
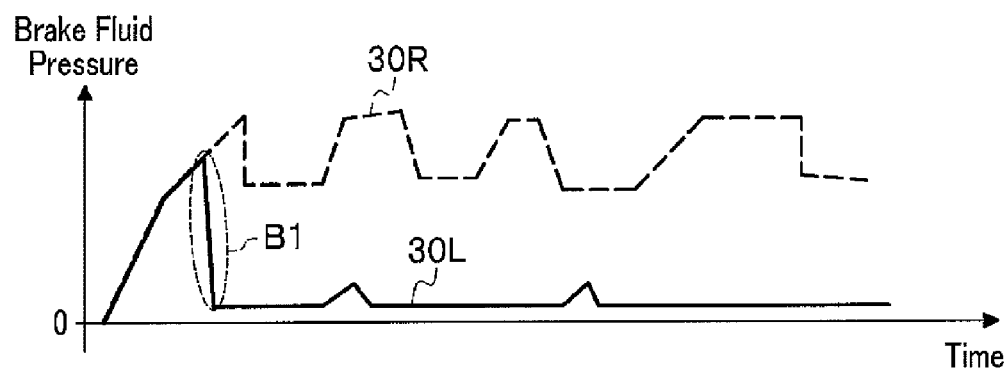
FIG. 3B is a graph illustrating a brake fluid pressure supplied to a brake apparatus of a vehicle running on the split μ road.

FIG. 2 shows a whole body of the vehicle 2 viewed from above that is running on a split μ road. FIG. 3A illustrates a vehicle body speed and a wheel speed while a vehicle is running on a split μ road. FIG. 3B illustrates the brake fluid pressure supplied to the braking device 30 while the vehicle 2 is running on a split μ road. In FIG. 3A, vertical axes indicate a vehicle body speed and the wheel speed while a horizontal axis indicates an elapsed time. In FIG. 3B, a vertical axis indicates the brake fluid pressure while a horizontal axis indicates an elapsed time.

There is a difference in the road surface resistance between the left side (LEFT) and the right side (RIGHT) of the vehicle 2 running on the split μ road. In the case of the split μ road as indicated in FIG. 2, the road surface resistance on the left side of the vehicle 2 (low μ road) is lower than the road surface resistance of the ordinary road. On the other hand, the road surface resistance on the right side of the vehicle 2 (high μ road) is an ordinary value or higher than the ordinary value.

In FIG. 3A, the wheel speed of the wheel on the high μ road (corresponding to the wheel speed of the right side wheel 3R in the example described in FIG. 2) is indicated by a dashed line, while the wheel speed of the wheel on the low μ road (corresponding to the wheel speed of the left side wheel 3L in the example described in FIG. 2) is indicated by a solid line. A dashed and dotted line in FIG. 3A indicates a vehicle body speed of the vehicle 2.

In FIG. 3B, the brake fluid pressure supplied to the braking device on the high μ side (corresponding to the braking device 30R on right side in the example described in FIG. 2) is indicated by a dashed line, while the brake fluid pressure supplied to the braking device on the low μ side (corresponding to the braking device 30L on left side in the example described in FIG. 2) is indicated by a solid line.

When a driver pushes down a brake pedal (not shown) while the vehicle 2 is running on the split μ road, whose left side corresponds to the low μ road and whose right side corresponds to the high μ road, as is shown in FIG. 2, a VSA device of a comparison example works to reduce a braking force as the left side wheels 3L are locked or possibly locked. As a result, there is a yawing moment $Y_m$ applied to turn the vehicle 2 clockwise and driving stability of the vehicle 2 becomes worse. When the yawing moment $Y_m$ is applied to the vehicle 2, the driver operates the steering wheel to turn the steered wheels counter-clockwise and then the vehicle 2 becomes in a counter steer state.

Here, the vehicle 2 being in the counter steer state means that the turn angle of the steered wheels is made in the opposite turning direction (counter-clockwise direction in the example of FIG. 2) to a direction in which the vehicle 2 is turning (clockwise direction in the example of FIG. 2).

On the other hand, the VSA device 6 according to the present embodiment calculates the wheel speeds of the wheels 3 from the wheel speed signals output by the wheel speed sensors 7 (See FIG. 1) and outputs the calculated wheel speeds to the vehicle control device 50. In case there is any wheel 3 whose wheel speed is markedly lower than the other wheels 3, the VSA device 6 determines that this wheel 3 rotating at the markedly lower wheel speed may be locked and performs ABS control. In the case of the vehicle 2 running on the split μ road whose left side corresponds to the low μ road as shown in FIG. 2, the left side wheels 3L (on the low μ side) as indicated by a solid line in FIG. 3A is possibly locked (See A1 portion in FIG. 3A).

In this case, the VSA device 6 lowers the brake fluid pressure supplied to the left side wheels 30L as shown FIG. 3B (See B1 portion in FIG. 3B). On this ABS control being performed, the wheel speed of the left side wheels 3L increases as shown in FIG. 3A (See A2 portion in FIG. 3A) and there is no risk of the left side wheels being locked.

The VSA device 6 and the vehicle control device 50 are capable of applying a well known ABS control technique.

When the vehicle 2 is running on a driving road 100 that is the split μ road (See FIG. 2), there is a yawing moment $Y_m$ applied to turn the vehicle 2 clockwise. On the yawing moment being applied to the vehicle 2, the vehicle control device 50 as indicated in FIG. 1 instructs the steering controller 51 to drive the AS device 4 to turn counter-clockwise the front wheels 3 which are steered wheels. The vehicle control device 50 sets a turn angle by which the wheels 3 are to be turned counter-clockwise (a control amount by the AS device 4) based on the yawing moment $Y_m$ applied to the vehicle 2.

In short, the vehicle control device 50 (See FIG. 1) of the present embodiment calculates (estimates) a yawing moment $Y_m$ applied to the vehicle 2 based on the braking force difference (difference between the left side braking force and the right side braking force) created on the vehicle 2 running on the split μ road.

The vehicle control device 50 calculates the braking force based on the brake fluid pressure supplied to the braking device 30 as shown in FIG. 1 and an equation (1).

$$\text{Braking Force} = \text{(Brake Fluid Pressure)} \times \text{(Brake Piston Area)} \times \text{(Pad μ Value of Brake Pad)} \times \text{(Brake Effective Radius)} / \text{(Tire Dynamic Radius)} \quad (1)$$

In the equation (1), the brake piston area and the brake effective radius are predetermined values just dependent on the vehicle 2 (especially wheels 3 and braking device 30) and constant as far as the vehicle 2 is concerned. The pad μ value of the brake pad corresponds to a friction coefficient of a friction material for friction braking.

The vehicle control device 50 as shown in FIG. 1 determines whether the driving road 100 on which the vehicle 2 is running corresponds to the split μ road, based on the braking force the vehicle control device 50 calculates.

The vehicle control device 50 substitutes the brake fluid pressure supplied by the VSA device 6 to the left wheel braking device 30L into the equation (1) and calculates a left side wheel braking force to stop the left side wheels 3L from rotating. Likewise the vehicle control device 50 substitutes the brake fluid pressure supplied by the VSA device 6 to the right wheel braking device 30R into the equation (1) and calculates a right side wheel braking force to stop the right side wheels from rotating. Then the vehicle control device 50 determines that the driving road 100 on which the vehicle 2 is running corresponds to the split μ road if the braking force difference between the left side braking force and the right side braking force is larger than a predetermined threshold value.

The predetermined threshold value for determining whether the driving road 100 is the split μ road is preset as a characteristic value for the vehicle 2.

The vehicle control device 50 calculates, for example, a yawing moment $Y_m$ with a predetermined equation. The vehicle control device 50 may be configured to have a correlation map indicating a correlation between the braking force difference and a yawing moment $Y_m$ and determine a yawing moment $Y_m$ associated with the braking force difference according to the correlation map. In this case the correlation map is prepared in advance.

The vehicle control device 50 is configured to determine a turn angle (corresponding to a control amount of the AS device 4) by which the wheels 3 are turned to counter the yawing moment $Y_m$ applied to the vehicle 2. The vehicle control device 50 may be further configured to have a map prepared in advance to correlate the turn angle of the wheels 3 with a pair of the vehicle body speed and the yawing moment $Y_m$ and determine an appropriate turn angle of the wheels 3 that is associated with a vehicle body speed and a yawing moment $Y_m$.

Once the turn angle of the wheels 3 is determined, the vehicle control device 50 instructs the steering controller 51 to drive the AS motor 42 to turn the steered wheels 3 by the determined turn angle. As a result, the wheels 3 (Steered wheels) are appropriately turned as the AS device 4 is under control, yawing of the vehicle 2 due to the yawing moment $Y_m$ is inhibited and the vehicle 2 is stabilized.

As explained, the vehicle 2 of the present embodiment has the AS device 4 controlled to turn the wheels 3 (Steered wheels) and cancel the yawing moment $Y_m$. As a result, stability of the vehicle 2 running is kept. The AS device 4 of the present embodiment is configured to operate such that the yawing moment applied to the vehicle 2 is cancelled and functions as a yawing moment cancelling device to inhibit the vehicle 2 from being turned by the yawing moment $Y_m$.

Figure 4A:
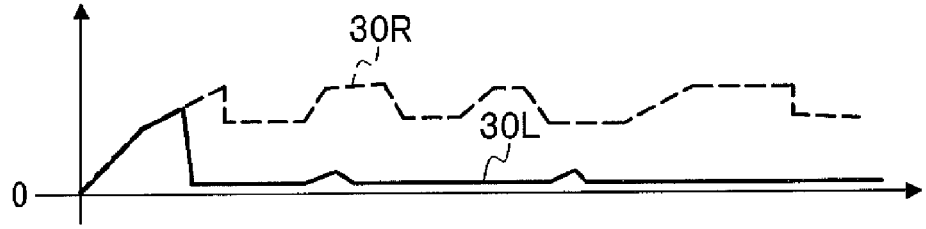
FIGS. 4A to 4C show dependence of the brake fluid pressure on the pad μ value.
Figure 4B:
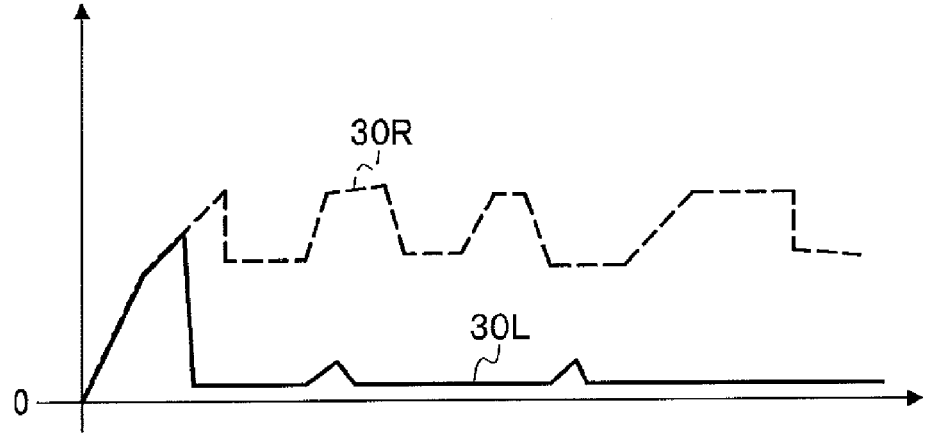
Figure 4C:
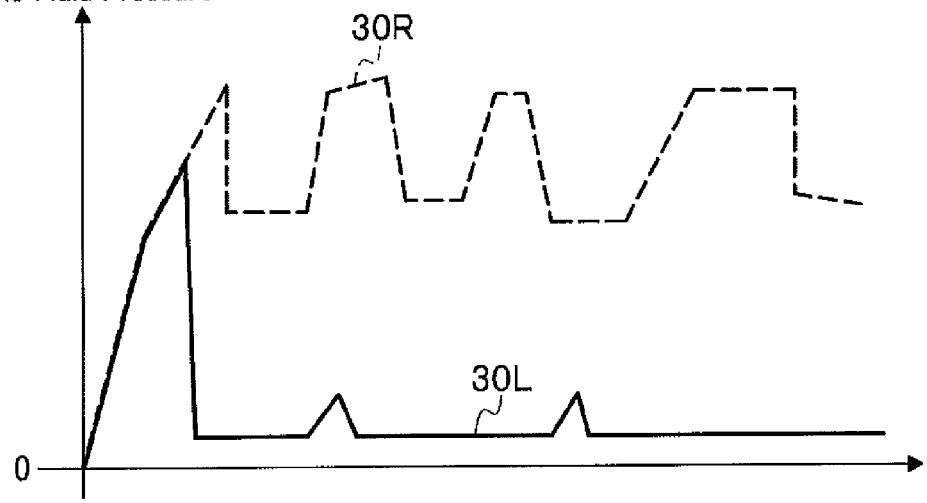

FIGS. 4A to 4C show dependence of the brake fluid pressure on the pad μ value in an embodiment of the present invention. FIG. 4A shows the brake fluid pressure with the pad μ value being larger than a reference value. FIG. 4B shows the brake fluid pressure with the pad μ value being equal to the reference value. FIG. 4C shows the brake fluid pressure with the pad μ value being smaller than the reference value. In each of FIGS. 4A to 4C, the vertical axis indicates the brake fluid pressure while the horizontal axis indicates the elapsed time.

FIGS. 4A to 4C show variation of the brake fluid pressure of the vehicle 2 (See FIG. 1) running on a road whose left side portion corresponds to a low μ road, as is the case with FIG. 3. In each of FIGS. 4A to 4C a dashed line indicates the brake fluid pressure supplied to the right wheel braking device 30R while a solid line indicates the brake fluid pressure supplied to the left wheel braking device 30L. The reference value of the pad μ corresponds to a pad μ value (friction coefficient of friction material for braking) for the ordinary brake pad (not shown).

When the pad μ value of the brake pad (which is also referred to as an abbreviation of "pad μ value" in the description below) is larger than the reference value, the braking force becomes larger if the applied brake fluid pressure stays the same as when the pad μ value is equal to the reference value (corresponding to FIG. 4B). Therefore when the pad μ value is larger than the reference value, a pressure increase of the brake fluid pressure applied to the braking device 30 is smaller, as shown in FIG. 4A, than a pressure increase to be applied to the braking device 30 when for the pad μ value is equal to the reference value, in order to generate so large a braking force as that when the pad μ value is equal to the reference value (corresponding to FIG. 4B).

On the other hand, when the pad μ value of the brake pad is smaller than the reference value, the braking force is smaller if so high a brake fluid pressure as that when the pad μ value is equal to the reference value is applied to the braking device 30. Therefore, when the pad μ value is smaller than the reference value, a pressure increase of the brake fluid pressure applied to the braking device 30 is larger, as shown in FIG. 4C, than a pressure increase to be applied to the braking device 30 when the pad μ value is equal to the reference value, in order to generate so large a braking force as when the pad μ value is equal to the reference value (corresponding to FIG. 4B).

The vehicle control device 50 of the present embodiment (See FIG. 1) calculates (estimates) the braking force according to the equation (1). The reference value of the pad μ value that is a fixed value has been so far adopted to calculate the braking force according to the equation (1). Accordingly the vehicle control device of the comparison example calculates the braking force without taking the pad μ value into consideration.

If the vehicle control device 50 of a comparison example has a brake fluid pressure characteristic (corresponding to FIG. 4A) in which the pressure increase of the brake fluid pressure is smaller than that for the reference pad μ value, the vehicle control device 50 calculates a braking force that is smaller than the braking force for a brake fluid pressure characteristic in which the pressure increase of the brake fluid pressure is in a medium level, assuming that the pad μ value of the brake pad is the reference value.

On the other hand, if the vehicle control device 50 of an comparison example has a brake fluid pressure characteristic (corresponding to FIG. 4C) in which the pressure increase of the brake fluid pressure is larger than that for the reference pad μ value, the vehicle control device 50 calculates a braking force that is larger than the braking force for the brake fluid pressure characteristic in which the pressure increase of the brake fluid pressure is in a medium level, assuming that the pad μ value of the brake pad is the reference value.

As explained, if the vehicle control device 50 calculates the braking force without taking the pad μ value of the brake pad into consideration when the pad μ value of the brake pad changes, there is an error of the braking force calculated by the vehicle control device from the actual braking force that is being applied and the yawing moment $Y_m$ (See FIG. 2) being applied to the vehicle 2 cannot be accurately calculated (estimated).

The vehicle control device 50 of the present embodiment determines whether the driving road 100 on which the vehicle 2 is running is a split μ road or not, based on the braking force difference (between the left side braking force and the right side braking force).

However, if this braking force difference is calculated simply based on a difference between the brake fluid pressures supplied to the left and right braking devices 30L, 30R, the calculated braking force difference includes an error resulting from the change in the pad μ value of the brake pad. The brake fluid pressures applied to the left and right braking devices (30L, 30R) are reflected by the change in the pad μ value of the brake pad.

As explained, when the pad μ value of the brake pad changes from the reference value, the calculated braking force difference deviates from the actual braking force difference between the left wheel braking device 30L and the right wheel braking device 30R, if the braking force difference is calculated without taking the change in the pad μ value of the brake pad, which results in the vehicle control device 50 being unable to accurately determine whether the road 100 on which the vehicle 2 is running is the split μ road or not.

Therefore, the vehicle control device 50 of the present embodiment estimates the pad μ value of the brake pad and substitutes the estimated pad μ value into the equation (1) to calculate the braking force to be applied.

The vehicle control device 50 of the present embodiment estimates the pad μ value of the brake pad based on the brake fluid pressure applied to the braking device 30 and the front-rear direction acceleration of the vehicle 2.

When the brake fluid pressure is applied to the braking device 30 while the vehicle 2 is running, a braking force is generated and the vehicle 2 is decelerated. If the braking force is kept constant, the vehicle 2 is decelerated at a constant deceleration rate. In other words, the front-rear direction acceleration (deceleration rate) is constant. As indicated by the equation (1), if both the pad μ value of the brake pad and the brake fluid pressure are constant, the braking force is constant. As long as the pad μ value of the brake pad remains unchanged, the front-rear direction acceleration applied to the vehicle 2 is constant if the brake fluid pressure is constant.

Since there is a predetermined correlation between the pad μ value of the brake pad, the brake fluid pressure and the front-rear direction acceleration, the pad μ value of the brake pad can be calculated based on the brake fluid pressure and the front-rear direction acceleration, making use of an equation of a function corresponding to the correlation of the pad μ value of the brake pad with the brake fluid pressure and the front-rear direction acceleration.

The vehicle control device 50 of the present embodiment not only calculates the front-rear direction acceleration on the vehicle 2 from the acceleration signal outputted by the acceleration sensor 8, but also calculates (estimates) the pad μ value of the brake pad based on the calculated front-rear direction acceleration and the brake fluid pressure.

The vehicle control device 50 estimates the pad μ value of the brake pad and calculates (estimates) the braking force according to the equation (1) when it is appropriate to do so. For example, when a brake pedal (not shown) is pushed down for the braking force to be generated, the vehicle control device 50 estimates the pad μ value of the brake pad. Alternatively, the vehicle control device 50 may estimate the pad μ value of the brake pad whenever an ignition switch is switched on or every predetermined driving time (for example, every 100 hours, but not limited to a specific time).

The vehicle control device 50 substitutes the estimated the pad μ value of the brake pad into the equation (1) to calculate the braking force. According to this calculation, the braking force can be accurately calculated based on the front-rear direction acceleration and the brake fluid pressure, even if the state of the brake pad has changed (for example, corroded due to water absorption or deterioration with time due to wear).

As has been explained, the vehicle stabilization system 1 of the present embodiment ensures driving stability of the vehicle 2 by turning the steered wheels 3 when the braking force is applied to the vehicle 2 while the vehicle 2 is running on the split μ road. During this operation, the vehicle control device 50 calculates (estimates) the yawing moment $Y_m$ (See FIG. 2) applied to the vehicle 2 based on the braking force difference.

The vehicle control device 50 calculates the braking force by substituting the estimated pad μ value of the brake pad into the equation (1). Therefore, if the pad μ value of the brake pad changes for some reason, the vehicle control device 50 is able to accurately calculate the braking force, which enables determining more accurately whether the road on which the vehicle 2 is running is the split μ road and ensures driving stability of the vehicle 2.

Figure 5:
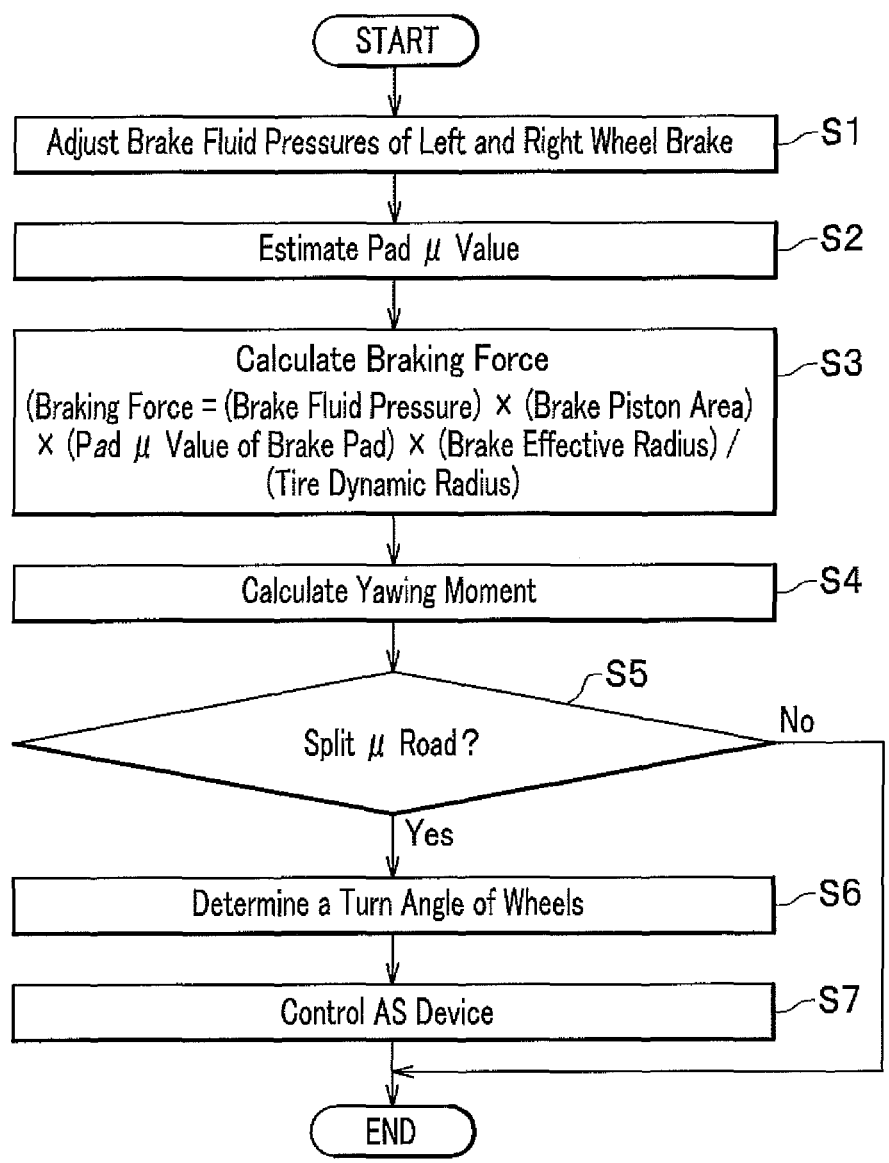
FIG. 5 shows a flow chart illustrating procedures to ensure that driving stability of a vehicle running is kept.

FIG. 5 is a flow chart illustrating procedures to ensure that driving stability of a vehicle running on the split μ road is kept. Every time the braking force is applied, the vehicle control device 50 performs the procedures as indicated in FIG. 5 to ensure driving stability of the vehicle 2. Hereinafter these procedures are explained with reference to any appropriate figure of FIGS. 1 to 4.

In Step S1, when there a risk of some of the wheels 3 being locked, the VSA device 6 performs ABS control to regulate the brake fluid pressures of the left and right wheels 3 to get rid of the risk.

In Step S2, the vehicle control device 50 estimates the pad μ value of the brake pad based on the brake fluid pressure applied to the braking device 30 and the front-rear direction acceleration.

In Step S3, the vehicle control device 50 calculates the braking force applied to the vehicle 2 by substituting the brake fluid supplied to the braking device 30 and the pad μ value of the brake pad that is estimated at Step S2 into the equation (1).

In Step S4, the vehicle control device 50 calculates the yawing moment applied to the vehicle 2 based on the braking force difference created on the vehicle 2 between the left wheel braking force and the right wheel braking force.

In Step S5, the vehicle control device 50 determines whether the driving road 100 on which the vehicle 2 is running is a split μ road or not, based on the braking force difference on the vehicle 2 between left wheel braking force and right wheel braking force.

When the vehicle control device 50 determines that the driving road 100 on which the vehicle 2 is running is not a split μ road as a result ("No" in Step 5), the vehicle control 50 ends the procedures. On the other hand, when the vehicle control device 50 determines that the driving road 100 on which the vehicle 2 is running is a split μ road, the vehicle control device 50 goes to Step 6.

In Step 6, the vehicle control device 50 determines a turn angle (control amount by the AS device) by which the wheels 3 are turned, based on the calculated yawing moment $Y_m$.

In Step 7, the vehicle control device 50 controls the AS device 4 in such a way that the wheels 3 (steered wheels) are turned by the determined turn angle. With this operation, the yawing moment on the vehicle 2 is suppressed and driving stability of the vehicle 2 is ensured.

Figure 6:
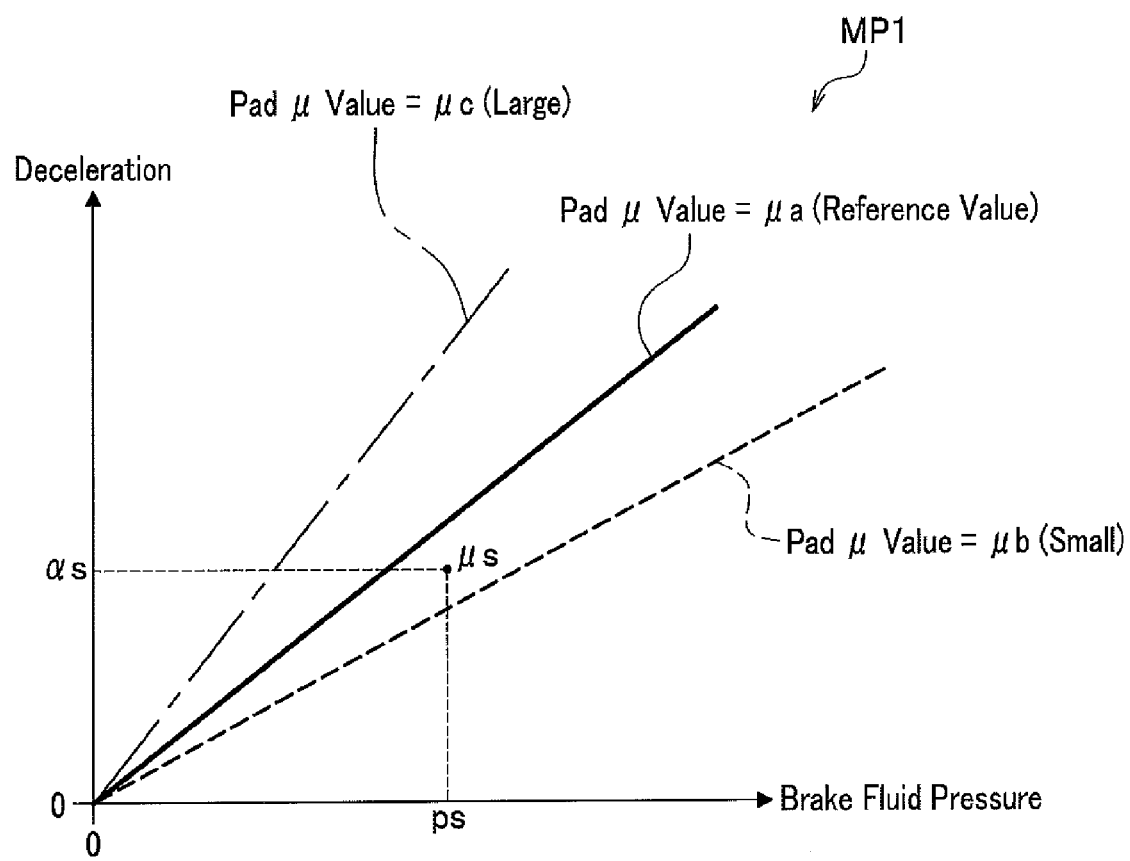
FIG. 6 shows a correlation map illustrating a correlation between a pad μ value, the brake fluid pressure and a forward-and-backward acceleration.

In this embodiment, the vehicle control device 50 may be configured to calculate (obtain) the pad μ value of the brake pad making use of a correlation map as shown in FIG. 6.

FIG. 6 is a the correlation map indicating a correlation between the pad μ value of the brake pad, the brake fluid pressure and the front-rear direction acceleration (deceleration). A vertical axis in FIG. 6 indicates the deceleration and the horizontal axis indicates the brake fluid pressure.

In the correlation map MP1 in FIG. 6, the deceleration (for positive values) of the vehicle 2 becomes larger as the brake fluid pressure is becoming large.

In FIG. 6, a solid line indicates the change characteristic of the front-rear direction acceleration relative to the increasing brake fluid pressure when the pad μ value of the brake pad is a reference value ($\mu_a$). A dashed line in FIG. 6 indicates the change characteristic of the front-rear direction acceleration relative to the increasing brake fluid pressure when the pad μ value of the brake pad is a value ($\mu_b$) smaller than the reference value ($\mu_a$). In this case (pad μ value=$\mu_b$), a change rate of the deceleration for the pad μ value=$\mu_b$ relative to the increasing brake fluid pressure is smaller than a change ratio of the deceleration rate for the pad μ value=$\mu_a$ relative to the increasing brake fluid pressure.

In FIG. 6, a dashed-dotted line indicates the change characteristic of the front-rear direction acceleration relative to the increasing brake fluid pressure when the pad μ value of the brake pad is larger than the reference value ($\mu_a$). In this case (pad μ value=$\mu_c$), a change rate of the deceleration for the pad μ value=$\mu_c$ relative to the increasing brake fluid pressure is larger than the change ratio of the deceleration rate for the pad μ value=$\mu_a$ relative to the increasing brake fluid pressure.

To be specific, when the vehicle control device 50 has the brake fluid pressure of "$P_s$" and the deceleration rate of "$\alpha_s$", the pad μ value of the brake pad is obtained as the pad μ value "$\mu_s$" from a point for "$P_s$" and "$\alpha_s$" on the correlation map MP1 in FIG. 6. If the point for "$P_s$" and "$\alpha_s$" is between the change characteristic line (solid line) for "$\mu_a$" and the change characteristic line (dashed line) for "$\mu_b$", the pad μ value "$\mu_s$" is obtained by interpolation between "$\mu_a$" and "$\mu_b$" assuming a proportional relation.

Although the above mentioned embodiment indicates that the vehicle control device 50 determines whether the road on which the vehicle 2 is running is the split μ road or not based on the braking force difference of the vehicle 2 (between the left wheel braking force and the right wheel braking force), the present invention is not limited to this embodiment. The vehicle control device 50 of the present embodiment may determines whether the road on which the vehicle 2 is running is the split μ road or not based on slip rates of left and right wheels.

Furthermore, although the above mentioned embodiment indicates that the AS device 4 has a yawing moment cancelling function of reducing turning of the vehicle 2 by the yawing moment $Y_m$, whatever configuration of the present embodiment that has a function for cancelling the yawing moment may be utilized.

The invention claimed is:

1. A vehicle stabilization system comprising:
    a vehicle driving stability control device configured to have a braking device generate a braking force to reduce rotation of wheels and performing an anti-lock braking control when a vehicle is braked; and
    a yawing moment cancelling device for cancelling a yawing moment applied to the vehicle,
    wherein the vehicle driving stability control device estimates a friction coefficient of a friction material for braking the wheels, calculates braking forces for the left and right wheels using the estimated friction coefficient, calculates a yawing moment applied to the vehicle based on a braking force difference between a left wheel braking force to reduce rotation of the left wheels and a right wheel braking force to reduce rotation of the right wheels and determines an operation amount on the yawing moment cancelling device,
    wherein if the braking force difference is larger than a predetermined threshold value, the vehicle driving stability control device determines that a driving road of the vehicle is a split μ road and operates the yawing moment cancelling device by the operation amount, and
    wherein the vehicle driving stability control device estimates the friction coefficient of the friction material for braking the wheels based on a brake fluid pressure supplied to the braking device and a front-rear direction acceleration of the vehicle using a function corresponding to the predetermined correlation of the friction coefficient of the friction material for braking the wheels with the brake fluid pressure supplied to the braking device and the front-rear direction acceleration of the vehicle.

2. The vehicle stabilization system as described in claim 1 wherein the yawing moment cancelling device is a steering device configured to be capable of automatically turning steered wheels of the vehicle.

\* \* \* \* \*